US008827519B2

(12) United States Patent
Yamamoto et al.

(10) Patent No.: US 8,827,519 B2
(45) Date of Patent: Sep. 9, 2014

(54) VEHICULAR LAMP

(75) Inventors: Misao Yamamoto, Shizuoka (JP); Hideyuki Aihara, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 0 days.

(21) Appl. No.: 13/237,243

(22) Filed: Sep. 20, 2011

(65) Prior Publication Data

US 2012/0081916 A1 Apr. 5, 2012

(30) Foreign Application Priority Data

Sep. 30, 2010 (JP) ................................ 2010-221027

(51) Int. Cl.
*B60Q 1/00* (2006.01)

(52) U.S. Cl.
USPC ............................ 362/516; 362/519; 362/549

(58) Field of Classification Search
USPC ......... 362/516, 459, 480, 487, 499, 507, 514, 362/519, 541, 542, 546, 547, 549, 294, 373
See application file for complete search history.

(56) References Cited

U.S. PATENT DOCUMENTS

| | | | | |
|---|---|---|---|---|
| 5,842,781 | A * | 12/1998 | Yamada et al. | 362/519 |
| 6,318,883 | B1 * | 11/2001 | Sugiyama et al. | 362/267 |
| 6,543,923 | B2 * | 4/2003 | Tamai | 362/521 |
| 7,478,932 | B2 * | 1/2009 | Chinniah et al. | 362/507 |
| 7,661,857 | B2 * | 2/2010 | Ohzono | 362/473 |
| 7,665,868 | B2 * | 2/2010 | Sato et al. | 362/373 |
| 7,883,251 | B2 * | 2/2011 | Ansari et al. | 362/547 |
| 2007/0091632 | A1 * | 4/2007 | Glovatsky et al. | 362/547 |
| 2007/0127257 | A1 * | 6/2007 | Erion et al. | 362/547 |

FOREIGN PATENT DOCUMENTS

| | | |
|---|---|---|
| JP | 1997-330602 A | 12/1997 |
| JP | 11185503 | 7/1999 |

OTHER PUBLICATIONS

Japanese Office Action—Japanese Application No. 2010-221027 issued on Mar. 18, 2014.

* cited by examiner

*Primary Examiner* — Diane Lee
*Assistant Examiner* — Naomi M Wolford
(74) *Attorney, Agent, or Firm* — Cantor Colburn LLP

(57) ABSTRACT

The present disclosure has been made in an effort to provide a vehicular lamp that can adopt a low-priced material having a low heat-resisting temperature as a material for a reflector. A vehicular lamp includes a tail and stop lamp bulb and a reflector reflecting light from bulb to the front of the lamp, in a lamp chamber defined by a lamp body and a front cover. In addition, lamp body includes an opening for exposing the rear surface of reflector in the vicinity of tail and stop lamp bulb to the outside of the lamp chamber.

4 Claims, 5 Drawing Sheets

VEHICULAR LAMP

CROSS-REFERENCE TO RELATED APPLICATIONS

This application is based on and claims priority from Japanese Patent Application No. 2010-221027, filed on Sep. 30, 2010, with the Japanese Patent Office, the disclosure of which is incorporated herein in its entirety by reference.

TECHNICAL FIELD

The present disclosure relates to a vehicular lamp for a vehicle.

BACKGROUND

In the related art, there is known a vehicular lamp in which a bulb serving as a light source and a substantially parabolic reflector reflecting light from the bulb toward the front of a lamp are provided in a lamp chamber defined by a lamp body and a front cover, and the reflector is fixed to the lamp body. See, for example, Japanese Patent Application Laid-Open No. Hei 9-330602.

However, since the inner part of the lamp chamber is substantially in an airtight condition, the temperature in the lamp chamber is increased due to the heat emission of the bulb. As a result, the temperature of the reflector becomes high, and a high-priced material such as high heat polycarbonate having excellent heat-resistance is required, thereby making it difficult to reduce cost.

SUMMARY

The present disclosure has been made in an effort to provide a vehicular lamp that adopts a low-priced material having a low heat-resisting temperature as a material for a reflector in order to reduce the cost for manufacturing.

According to an exemplary embodiment of the present disclosure, there is provided a vehicular lamp including a light source and a reflector reflecting light from the light source toward the front side of the lamp in a lamp chamber defined by a lamp body and a front cover. In particular, the lamp body includes an opening for exposing at least the rear surface of the reflector in the vicinity of the light source to the outside of the lamp chamber.

According to the vehicular lamp having the above configuration, since the reflector in the vicinity of the light source is exposed, the reflector heated by heat of the light source may be cooled down by the outdoor air. For example, in the case of a rear combination lamp, the heated reflector may be cooled down by the outdoor air of a trunk room. As a result, a high-priced material having excellent heat resistance does not need to be used as a material for the reflector, such that a low-priced material having a low heat-resisting temperature may be adopted for the reflector.

Further, in the vehicular lamp having the above-configuration, the lamp body may include a first opposing wall erected on the circumference of the opening at the surface of the opening, and the reflector may include a second opposing wall corresponding to the first opposing wall at the rear surface of the reflector. While the lamp body and the reflector are attached to each other, a gap formed by the first opposing wall and the second opposing wall forms a foreign material block structure in which a longitudinal cross section along the optical axis of the lamp has a concave-convex shape curved at least once.

According to the vehicular lamp having the above configuration, while the reflector and the lamp body are attached to each other, since the foreign material block structure is formed in the gap formed between the first opposing wall and the second opposing wall, it is possible to prevent foreign materials such as worms or dust from penetrating. As a result, an excellent appearance can be maintained in the lamp chamber while ensuring the cooling performance of the reflector.

Further, in the vehicular lamp having the above-configuration, the exposed portion of the reflector may protrude to the rear side of the lamp from the opening of the lamp body.

According to the vehicular lamp having the above configuration, since the exposed portion of the reflector protrudes from the lamp body, the cooling performance by the outdoor air can be improved, and since the reflector itself can be placed inside the lamp when viewed from the front, the appearance can be improved.

According to the vehicular lamp of the present disclosure, since a portion of the reflector in the vicinity of a light source is exposed, the reflector heated by heat of the light source can be efficiently cooled down by the outdoor air, thereby manufacturing the reflector with a low-priced material having a low heat-resisting temperature. As a result, it is possible to reduce the manufacturing cost of the vehicular lamp.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of a vehicular lamp according to the present disclosure will be described with reference to FIGS. 1 to 6.

Figure 1:
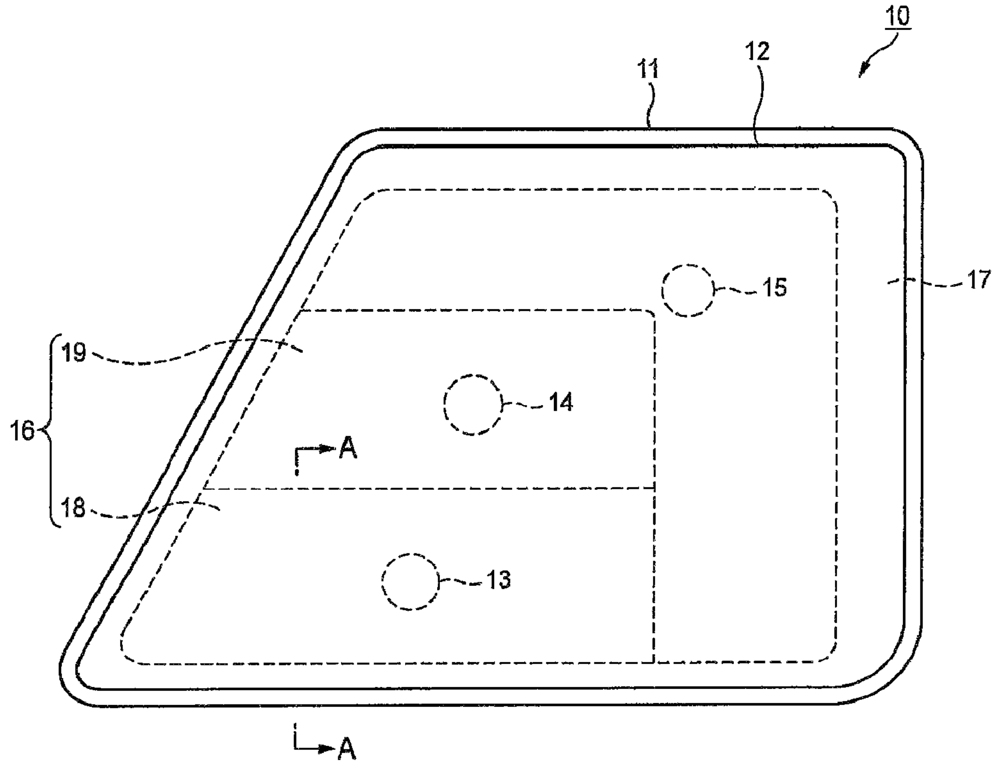
FIG. 1 is a front view of a vehicular lamp illustrating an exemplary embodiment of the present disclosure.

As shown in FIG. 1, a vehicular lamp 10 of an exemplary embodiment is applied to a rear combination lamp including a resin-made lamp body 11 fixed to a tail of a vehicle body while a vehicle rear side is being opened, and a front cover 12 attached to a circumference of an opening of lamp body 11.

Vehicular lamp 10 includes a tail and stop lamp bulb 13, a turn signal lamp bulb 14, a side marker lamp bulb 15, and a reflector 16 as lamp units, in a lamp chamber defined by lamp body 11 and front cover 12. Reflector 16 is a composite type reflector including a tail and stop reflector 18 and a turn signal reflector 19. Further, an extension 17 is placed at the circumference of the opening of lamp body 11.

A main part of vehicular lamp 10 of the exemplary embodiment will be described based on a configuration of a part in the vicinity of tail and stop lamp bulb 13. Further, a fixation structure of reflector 18 to lamp body 11 will be omitted.

Figure 2:
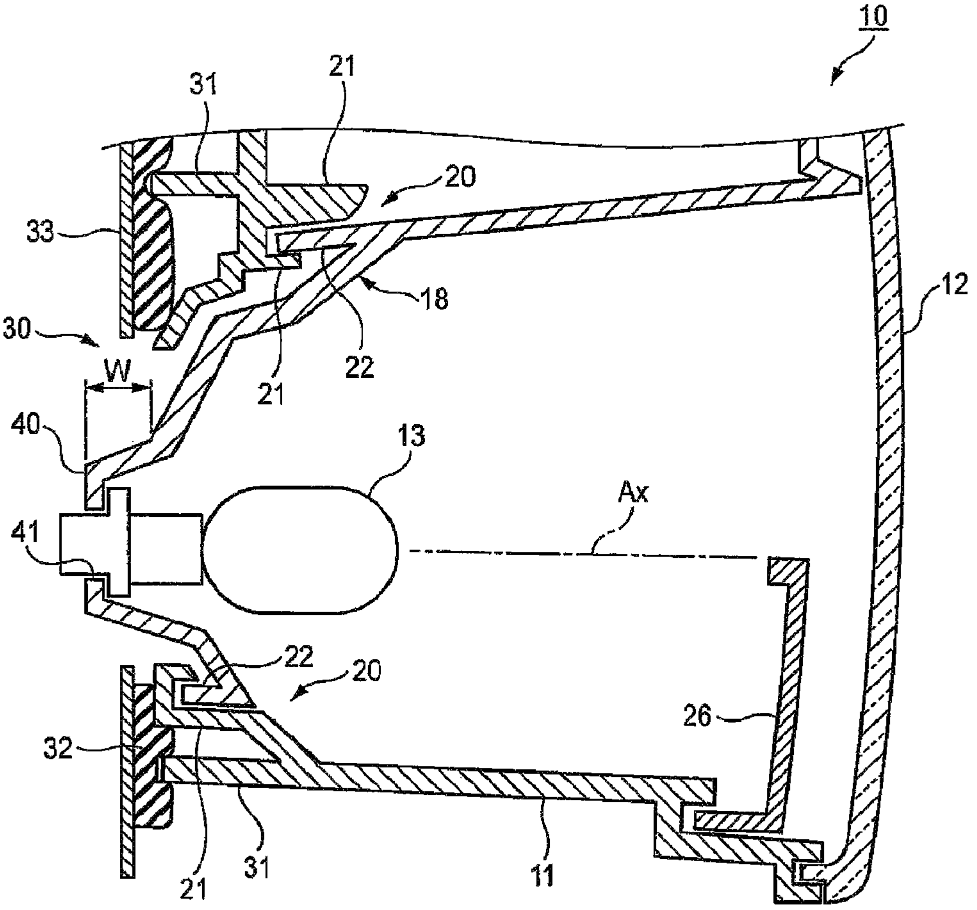
FIG. 2 is a cross-sectional view taken along line A-A of FIG. 1.

As shown in FIG. 2, tail and stop lamp bulb 13 is fitted and fixed into a bulb insertion attachment hole 41 provided in a bulb insertion attachment part 40 of reflector 18 together with an exclusive socket thereof. A reflex reflector (RR) 26 is placed in front of tail and stop lamp bulb 13.

Figure 3:
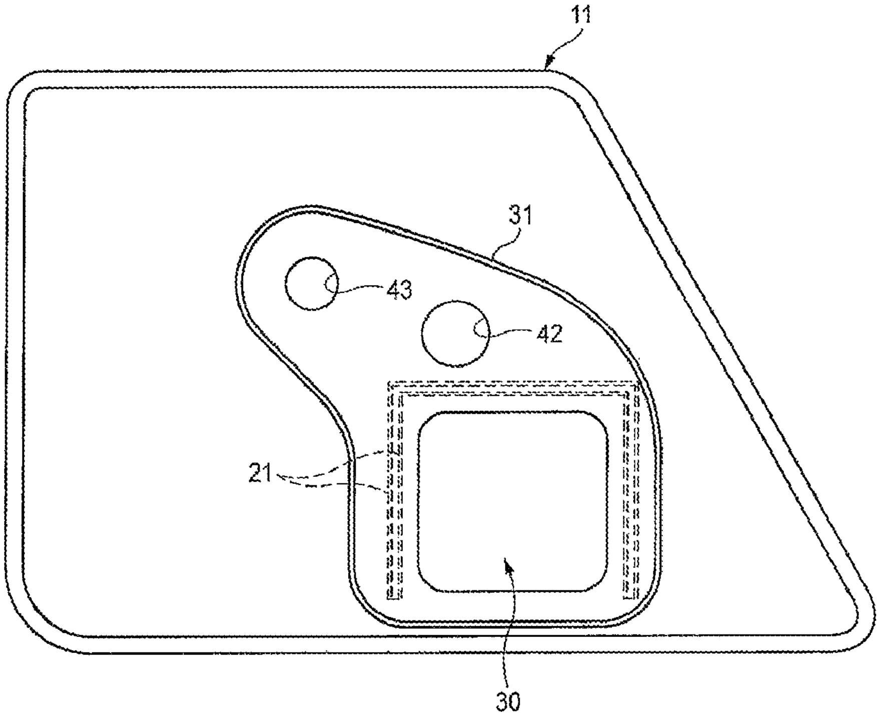
FIG. 3 is a rear view of a lamp body of FIG. 2.
Figure 4:
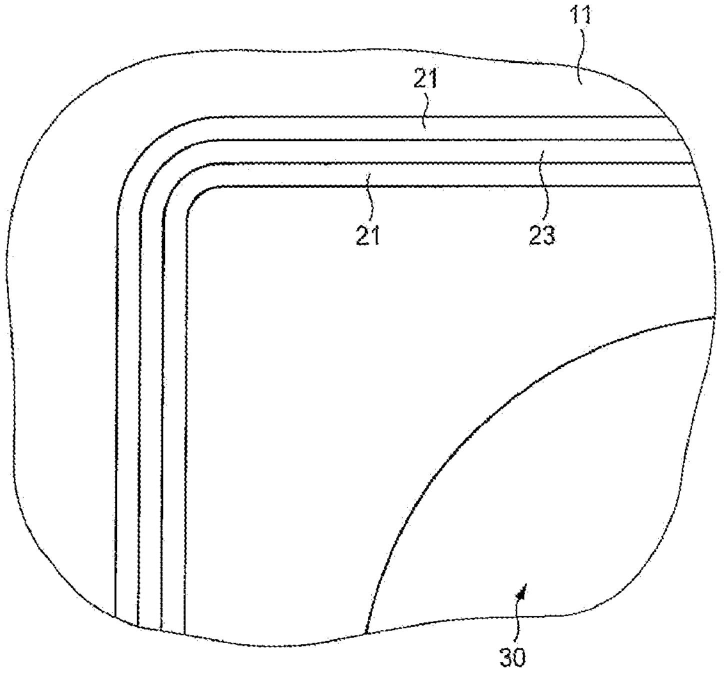
FIG. 4 illustrates a partially enlarged view of a main part viewed from the surface of FIG. 3.

Lamp body 11 includes an opening 30 for exposing the vicinity of the bulb insertion attachment part 40 in the vicinity of tail and stop lamp bulb 13 of reflector 18 to the outside of the lamp chamber (see FIG. 3). The exposed portion of reflector 18 protrudes from opening 30 of lamp body 11 to the rear side of the lamp by a length of W.

At the rear surface of lamp body 11, a circular waterproof rib 31 is provided with being erected surrounding bulb insertion attachment holes 42 and 43 different from opening 30 (see FIG. 3). For example, a waterproof structure for preventing water from penetrating into the vicinity of bulbs 13 to 15 is formed by waterproof rib 31 with a seat packing 32 mounted on a vehicle body panel 33 at the trunk room side.

Lamp body 11 is provided with a pair of first ribs 21 that are erected substantially in '⊐' shape in the vicinity of an opening circumference on the surface of opening 30. A rib insertion portion 23 is formed between the pair of first ribs 21 and 21 (see FIG. 4). Further, second ribs 22 corresponding to first ribs 21 are provided with being erected substantially in the '⊐' shape at the rear surface of reflector 18 (see FIG. 5).

A foreign material block structure formed by attaching reflector 18 to lamp body 11 in vehicular lamp 10 of the exemplary embodiment will be described.

Figure 6A:
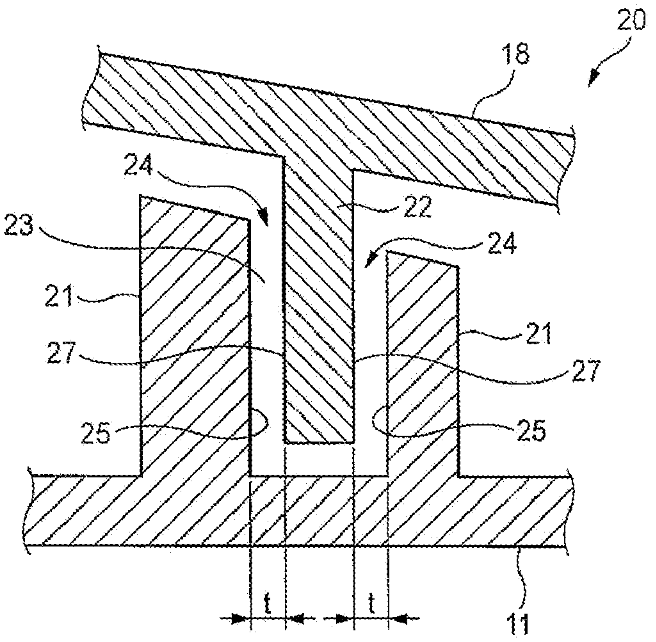
FIG. 6A is a schematic diagram illustrating an example of a foreign material block structure formed in a gap between a first opposing wall and a second opposing wall.

As shown in FIG. 6A, a rib insertion portion 23 is formed in lamp body 11 by pair of first ribs 21 and 21 opposing each other, and second rib 22 of reflector 18 is placed at rib insertion portion 23 with the attachment of reflector 18. As a result, a gap 24 having an interval of t is formed by first opposing walls 25 which is an inner surface of first rib 21 and second opposing walls 27 which are sides of second rib 22. Further, interval t is a narrow gap of approximately 0.5 mm.

Gap 24 has a maze structure in which a longitudinal cross section along an optical axis Ax of the lamp has a concave-convex shape curved four times to form foreign material block structure 20 for preventing worms or dusts from being invaded. Further, foreign material block structure 20 shown in an upper part of FIG. 2 has a maze structure curved twice, and foreign material block structure 20 shown in a lower part has a maze structure curved three times.

Figure 5:
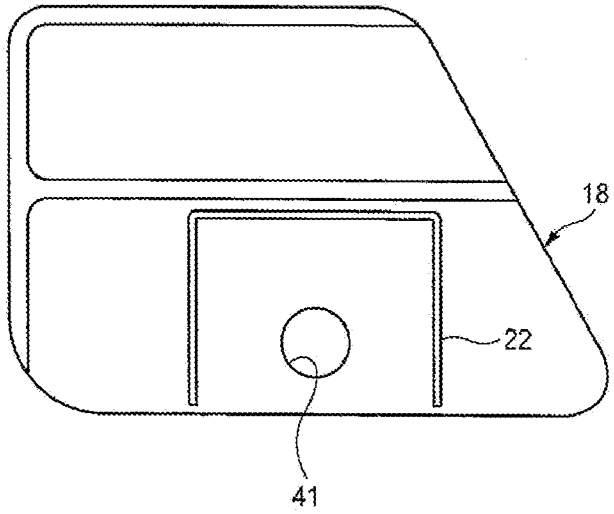
FIG. 5 is a rear view of a reflector of FIG. 2.
Figure 6B:
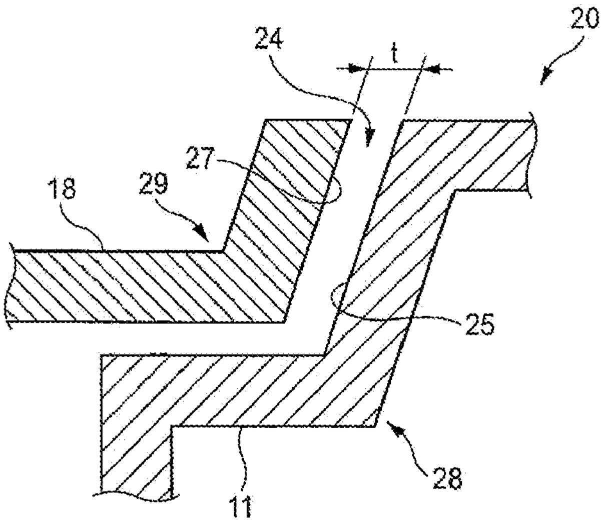
FIG. 6B is a schematic diagram of another example.

Besides, as shown in FIG. 6B, it is possible to achieve a sufficient effect even with gap 24 of interval t curved once by a first curved portion 28 of lamp body 11 and a second curved portion 29 of reflector 18. As an example, the gap is formed by a lower edge of opening 30 where first rib 21 is not formed in lamp body 11 as shown in FIG. 3 and a lower edge where second rib 22 is not formed in reflector 18 as shown in FIG. 5.

According to the vehicular lamp of the exemplary embodiment, since lamp body 11 includes opening 30 for exposing the rear surface of reflector 18 in the vicinity of light source 13 to the outside of the lamp chamber, reflector 18 heated by heat of light source 13 may be cooled by the outdoor air. As a result, a high-priced material having excellent heat resistance does not need to be used as a material for reflector 18, such that a low-priced material having a low heat-resisting temperature may be adopted for reflector 18.

Further, according to the vehicular lamp of the exemplary embodiment, lamp body 11 has first opposing wall 25 erected on the circumference of the opening at the surface of opening 30, and reflector 18 has second opposing wall 27 corresponding to first opposing wall 25 at the rear surface thereof. While lamp body 11 and reflector 18 are attached to each other, gap 24 formed by first opposing wall 25 and second opposing wall 27 forms foreign material block structure 20 having the concave-convex shape curved at least once. As a result, the worms or dust can be prevented from penetrating into the lamp, such that an excellent appearance can be maintained in the lamp chamber while ensuring the cooling performance of reflector 18.

In addition, according to the vehicular lamp of the exemplary embodiment, since the exposed portion of reflector 18 protrudes from opening 30 of lamp body 11 to the rear side of the lamp, the cooling performance can be improved by the outdoor air and since reflector 18 itself can be placed inside the lamp, the appearance can be improved.

Moreover, the present disclosure is not limited to the above-mentioned exemplary embodiment, but may be changed and modified appropriately without departing from the scope of the present disclosure. Besides, materials, shapes, dimensions, numerical values, forms, the number, and installation spaces of the components in the above-mentioned exemplary embodiment are selected arbitrarily, and not limited thereto as long as the present disclosure can be achieved.

For example, in the exemplary embodiment, although the configuration in the vicinity of tail and stop lamp bulb 13 has been described as an example, the same configuration can be applied to even the vicinity of turn signal lamp bulb 14. Further, although the '⊐' shape has been described as an example with respect to the shapes of first rib 21 and second rib 22, first rib 21 and second rib 22 may adopt various shapes depending on the shape of lamp body 11 or reflector 18.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp, comprising:

a light source including a base portion and provided in a lamp chamber defined by a lamp body and a front cover; and a reflector including an insertion hole where the base portion of the light source is fitted and configured to reflect light from the light source toward the front of the lamp in the lamp chamber, wherein an opening is formed in the lamp body around the insertion hole in such a way that a rear surface of the reflector around the insertion hole where the base portion of the light source is fitted protrudes rearward through the opening and is exposed directly to the outside of the lamp body such that the opening exposes the rear surface of the reflector surrounding the entire angle of the light source with respect to a plane perpendicular to an optical axis of the light source.

2. The vehicular lamp of claim 1, wherein the lamp body includes a first opposing wall erected on the circumference of the opening at the surface of the opening, and the reflector includes a second opposing wall corresponding to the first opposing wall at a rear surface thereof, and while the lamp body and the reflector are attached to each other, a gap formed by the first opposing wall and the second opposing wall forms a foreign material block structure in which a longitudinal cross section along the optical axis of the lamp has a concave-convex shape curved at least once in the vicinity of the opening.

3. The vehicular lamp of claim 1, wherein the exposed portion of the reflector surrounding the entire angle of the light source protrudes from the opening of the lamp body toward a rear side of the lamp.

4. The vehicular lamp of claim 2, wherein the gap has an interval of approximately 0.5 mm.

* * * * *